US008657953B2

(12) United States Patent
Farrington et al.

(10) Patent No.: US 8,657,953 B2
(45) Date of Patent: Feb. 25, 2014

(54) CEMENT ADDITIVE

(75) Inventors: Stephen A. Farrington, University Heights, OH (US); Madalina A. Stefan, Stephanskirchen (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/528,908

(22) Filed: Jun. 21, 2012

(65) Prior Publication Data

US 2012/0325121 A1 Dec. 27, 2012

Related U.S. Application Data

(60) Provisional application No. 61/500,882, filed on Jun. 24, 2011.

(51) Int. Cl.
C04B 24/10 (2006.01)
C04B 40/00 (2006.01)

(52) U.S. Cl.
USPC .......... 106/804; 106/708; 106/729; 106/790; 106/823

(58) Field of Classification Search
USPC .................. 106/708, 729, 790, 804, 823
See application file for complete search history.

(56) References Cited

U.S. PATENT DOCUMENTS

| | | | |
|---|---|---|---|
| 2,311,288 A | 2/1943 | Booth | |
| 2,311,290 A | 2/1943 | Booth | |
| 2,793,129 A | 5/1957 | Klein | |
| 2,900,265 A * | 8/1959 | Klein | 106/708 |
| 3,432,316 A | 3/1969 | Kelly et al. | |
| 3,485,649 A | 12/1969 | Kelly et al. | |
| 3,536,507 A | 10/1970 | Klein et al. | |
| 3,857,715 A | 12/1974 | Humphrey | |
| 3,992,260 A | 11/1976 | Suzuki et al. | |
| 4,961,789 A | 10/1990 | Barrenechea | |
| 5,017,234 A | 5/1991 | Gartner et al. | |
| 5,369,122 A | 11/1994 | Steinmetzer | |
| 5,429,675 A | 7/1995 | Cheung et al. | |
| 5,435,845 A | 7/1995 | Villa et al. | |
| 5,498,709 A | 3/1996 | Navia et al. | |
| 5,639,319 A | 6/1997 | Daly | |
| 5,741,471 A | 4/1998 | Deutsch et al. | |
| 5,961,712 A | 10/1999 | Sun et al. | |
| 6,005,057 A | 12/1999 | El-Jazairi | |
| 6,080,330 A | 6/2000 | Bloomer | |
| 6,090,197 A | 7/2000 | Vivian et al. | |
| 6,110,271 A | 8/2000 | Skaggs et al. | |
| 6,149,834 A | 11/2000 | Gall et al. | |
| 6,224,250 B1 | 5/2001 | Kreinheder et al. | |
| 6,290,772 B1 | 9/2001 | Cheung et al. | |
| 6,294,143 B1 | 9/2001 | Deutsch et al. | |
| 6,416,574 B1 | 7/2002 | Steelhammer et al. | |
| 6,416,684 B1 | 7/2002 | Bloomer | |
| 6,436,310 B1 | 8/2002 | Hartley et al. | |
| 6,518,223 B2 | 2/2003 | Schilling et al. | |
| 6,541,545 B1 | 4/2003 | Simmons et al. | |
| 6,545,068 B1 | 4/2003 | Simmons et al. | |
| 6,613,138 B2 * | 9/2003 | Welshimer et al. | 106/405 |
| 6,641,661 B1 | 11/2003 | Jardine et al. | |
| 6,641,753 B1 | 11/2003 | Bloomer | |
| 6,797,050 B2 | 9/2004 | Hoffman et al. | |
| 6,800,129 B2 | 10/2004 | Jardine et al. | |
| 6,811,604 B2 | 11/2004 | Mentink et al. | |
| 6,824,606 B1 | 11/2004 | Alvarez Berenguer et al. | |
| 6,907,708 B2 | 6/2005 | Naji et al. | |
| 6,916,369 B2 | 7/2005 | Chun et al. | |
| 7,048,793 B2 | 5/2006 | Chun et al. | |
| 7,067,000 B1 | 6/2006 | Szymanski et al. | |
| 7,067,003 B2 | 6/2006 | Cooney | |
| 7,087,110 B2 | 8/2006 | Jardine et al. | |
| 7,160,384 B2 | 1/2007 | Jardine | |
| 7,303,625 B2 | 12/2007 | Caveny et al. | |
| 7,368,488 B2 | 5/2008 | Nishikawa et al. | |
| 7,395,861 B2 | 7/2008 | Caveny et al. | |
| 7,422,062 B2 | 9/2008 | Caveny et al. | |
| 7,435,293 B2 | 10/2008 | Caveny et al. | |
| 7,462,236 B2 | 12/2008 | Chun et al. | |
| 7,473,379 B2 | 1/2009 | Ossian et al. | |
| 7,662,884 B2 | 2/2010 | Yuasa et al. | |
| 7,699,930 B2 | 4/2010 | Compton et al. | |
| 7,811,378 B2 | 10/2010 | Nungeβ et al. | |

(Continued)

FOREIGN PATENT DOCUMENTS

| | | |
|---|---|---|
| CN | 1 089 245 A | 7/1994 |
| CN | 101318792 A | 12/2008 |

(Continued)

OTHER PUBLICATIONS

Derwent-Acc-No. 1983-01852K, abstract of Soviet Union Patent Specification No. SU 909124 B (Jul. 1980).*
Derwent-Acc-No. 2011-K04381, abstract of Chinese Patent Specification No. CN 1012115316A (Jul. 2011).*
Asadi, Mosen, Ph.D; Beet-Sugar Handbook; Wiley-Interscience; pp. 517-545; John Wiley & Sons, Inc.; © 2007.
Godbole, Jayant; "Ethanol from Cane Molasses"; DOE + BBI. Hawaii Ethanol Workshop, Nov. 14, 2002, pp. 1-40; Honolulu, Hawaii.
Olbrich, Hubert; "The Molasses";Institute für Zukerindustrie, Berlin, Germany; 1963.

(Continued)

Primary Examiner — Anthony J Green
(74) Attorney, Agent, or Firm — Curatolo Sidoti Co., LPA; Joseph G. Curatolo; Vincent A. Cortese

(57) ABSTRACT

A cementitious material manufactured by a process including adding, after pyroprocessing, at least one desugared molasses to at least one cementitious and/or pozzolanic material during manufacture of the at least one cementitious and/or pozzolanic material. A method of manufacturing a cementitious material including adding, after pyroprocessing, at least one desugared molasses to at least one cementitious and/or pozzolanic material during manufacture of the at least one cementitious and/or pozzolanic material.

10 Claims, No Drawings

(56) References Cited

U.S. PATENT DOCUMENTS

| | | |
|---|---|---|
| 7,836,954 B2 | 11/2010 | Morgan et al. |
| 7,887,630 B2 | 2/2011 | Tran et al. |
| 7,892,353 B2 | 2/2011 | Tran et al. |
| 7,922,811 B2 | 4/2011 | Jardine et al. |
| 2004/0082776 A1 | 4/2004 | Busse et al. |
| 2004/0149172 A1 | 8/2004 | Jardine et al. |
| 2009/0227709 A1 | 9/2009 | Maeder et al. |
| 2011/0146540 A1 | 6/2011 | Jardine et al. |

FOREIGN PATENT DOCUMENTS

| | | |
|---|---|---|
| CN | 101337788 A | 1/2009 |
| FR | 1 490 178 A | 7/1967 |
| GB | 10424 | 4/1913 |
| GB | 939545 | 10/1963 |
| KR | 20030037597 | 5/2003 |
| SU | 1027367 A * | 1/1982 |
| WO | WO 00/44487 A1 | 8/2000 |
| WO | WO 2005/054149 A1 | 6/2005 |
| WO | WO 2005/110941 A1 | 11/2005 |
| WO | WO 2010/062484 A1 | 6/2010 |

OTHER PUBLICATIONS

Stolz, HNP, et al; "Enhancement of Sugar Production Part 2; Chromatographic Seperation of Sugarcane Molasses"; Proc S Afr Sug Technol Assn (2001) 75; pp. 351-357.

Thompson, MC; "The Potential Application of Ion Exclusion Chromatography for Additional Sucrose Recovery from Molasses"; Proceedings of the South African Sugar Technologists' Association; Jun. 1994; pp. 105-108.

International Search Report, Form PCT/ISA/210, mailed Oct. 10, 2012, for related PCT International Patent Application No. PCT/EP2012/061906.

Written Opinion, Form PCT/ISA/237, mailed Oct. 10, 2012, for related PCT International Patent Application No. PCT/EP2012/061906.

Office Action from the United States Patent and Trademark Office, mailed Dec. 7, 2012, for the related U.S. Appl. No. 13/528,903.

International Search Report, Form PCT/ISA/210, mailed Oct. 5, 2012, for corresponding PCT International Patent Application No. PCT/EP2012/061907.

Written Opinion, Form PCT/ISA/237, mailed Oct. 5, 2012, for corresponding PCT International Patent Application No. PCT/EP2012/061907.

* cited by examiner

CEMENT ADDITIVE

The present application claims the benefit of the filing date, under 35 U.S.C. §119(e), of U.S. Provisional Application Ser. No. 61/500,882, filed Jun. 24, 2011.

Cement additives typically include materials which are utilized during manufacture and/or processing of cement to increase the efficiency of the manufacturing process and/or increase the quality of the resulting cement. The term "cement" may be broadly defined to designate many different kinds of substances that are used as binders and/or adhesives. Hydraulic cements set, harden and gain strength in the presence of water and do not degrade or lose strength in the presence of moisture. Portland cement, one type of hydraulic cement, is prepared by grinding, then pyroprocessing a mixture of components including calcium carbonate (typically as limestone), aluminosilicate (typically as clay or shale), silicon dioxide (typically as sand) and miscellaneous iron oxides. During pyroprocessing, such as calcining and sintering, or clinkering, chemical reactions take place whereby hardened nodules, commonly referred to as cement clinker, are formed.

After the clinker has cooled, it is pulverized or ground, typically together with a small amount of gypsum and/or limestone, in a finish grinding mill to provide a fine, homogenous powdery product. Due to the extreme hardness of clinker, a large amount of energy is required to properly mill the clinker into the desired powder form. Grinding aids, one type of cement additive, may be used to reduce the energy required to grind the clinker. In addition to reducing grinding energy, commonly used grinding aids are frequently used to improve the ability of the powder to flow easily and reduce its tendency to form lumps during storage. Conventional grinding aids include glycols, alkanolamines, amine acetates, and aromatic acetates.

Grinding aids function, at least in part, by compensating for the charges on freshly broken surfaces. Through adsorption of the molecules of the grinding aid material to the surfaces of the ground particles, the surface energy requirements are satisfied. This minimizes particle agglomeration and prevents caking of the mill interior wall and coating of the grinding media. Mill efficiency and throughput are increased as a result.

Performance enhancers, another type of cement additive, function, at least in part, by increasing the reactivity of the cement. They may be added to improve the early-age or late-age strength of hydrated cementitious materials.

The cementitious composition industry is constantly searching for new additives which will increase the efficiency of cement manufacturing processes and/or produce improved cement materials.

Provided is a cement additive and/or cementitious composition comprising at least one desugared molasses. Also provided is a method of manufacturing a cementitious material comprising adding, after pyroprocessing, at least one desugared molasses to at least one cementitious and/or pozzolanic material during manufacture of the at least one cementitious and/or pozzolanic material.

As used herein, the term "desugared molasses" is defined as at least one of: (i) a molasses which has undergone a process to remove sugar from the molasses; or (ii) a molasses with a total sugar content less than or equal to about 45% by weight of the molasses, based on the dry weight of the molasses. In certain embodiments, a "desugared molasses" may have a sucrose content less than or equal to about 40% by weight of the molasses, based on the dry weight of the molasses. In certain embodiments, a "desugared molasses" may have a sucrose content less than or equal to about 35% by weight of the molasses, based on the dry weight of the molasses. In certain embodiments, a "desugared molasses" may have a sucrose content less than 30% by weight of the molasses, based on the dry weight of the molasses. In certain embodiments, a "desugared molasses" may have a total water content of less than about 40% by weight as manufactured, excluding any water added to the desugared molasses product after manufacturing, based on the total weight of the desugared molasses. In certain embodiments, a "desugared molasses" may exclude by-products of molasses fermentation processes.

Desugared molasses is available commercially from a number of sources, such as MidWest Agri-Commodities, San Rafael, Calif., American Crystal Sugar Company, Hillsboro, N. Dak. and Western Sugar Cooperative, Denver, Colo. As used herein, the term "desugared", when not used in the exact term "desugared molasses", refers to the result of a process to remove sugar from a material. The term "dry weight" refers to the total weight of a material or mixture, excluding the weight of any water present in the material or mixture.

Molasses is a byproduct of many sugar refining processes, and includes the material which is left over after sugar is extracted from a raw material, such as sugar beets or sugar cane. Molasses may contain high amounts of residual sugars, and for that reason molasses may be processed to extract additional sugar therefrom in order to maximize the sugar yield of a sugar refining process. The material left over after molasses has been processed is sometimes referred to generally as desugared molasses. However, the definition of the term "desugared molasses" provided above extends beyond byproducts of processes utilized to extract sugar from molasses.

A non-limiting example of a process to remove sugar from sugar beet molasses is molasses desugaring by chromatography ("MDC"), described in Chapter 8 of *Beet Sugar Handbook* by Mosen Asaid, PhD (Wiley Interscience, 2007, pp. 517-545). The MDC process may be based on ion-exclusion chromatography technology. The MDC process works based on the exclusion or rejection of ionic compounds and the inclusion or absorption of nonionic compounds. The MDC process is a multi-component process separating not only the sucrose fraction (or extract) from the nonsucrose fraction (raffinate), but also recovering other valuable components of molasses, such as betaine.

Briefly outlined, the steps of the MDC process include: (1) diluting the molasses to 60% to 70% dry solids with water; (2) filtering the diluted molasses to remove suspended solids; (3) heating the filtered dilute molasses; (4) deaerating the dilute molasses; (5) feeding the deaerated dilute molasses through a distributor to a separator containing packed resin in sodium or potassium form; and (6) eluting the separator to remove the products trapped by the resin. As the feed passes through the resin, the nonionic substances (mainly sucrose) attach to the resin, and the ionic substances (mainly nonsucroses) continue moving through the resin bed. The ionic compounds fraction (raffinate) is collected first, and after additional processing becomes a desugared molasses. The elution water then removes sucrose and other nonionic components from the resin in order to produce additional sugar.

A non-limiting example of a process to remove sugar from sugar cane molasses is simulated moving bed chromatography ("SMB chromatography"), described in "Enhancement of Sugar Production Part 2: Chromatographic Separation of Sugarcane Molasses" by H. N. P. Stolz and P. I. Bekker (Proc S Afr Sug Technol Ass (2001) 75, pp. 351-357). The SMB chromatography process is similar to the MDC process describe above, with additional measures taken to ensure efficient separation of sugar cane molasses.

Those materials which fall into the definition of desugared molasses provided above are typically (but need not be) waste products of sugar or other agricultural refining processes. For this reason, desugared molasses may be less costly to procure than other additives for cementitious compositions. Surprisingly, the subject desugared molasses provides benefits to cementitious compositions that meet or exceed those benefits provided by conventional additives, while reducing the potentially negative effects of such conventional additives as molasses.

In certain embodiments, a cementitious material is provided which is manufactured by a process comprising adding, after pyroprocessing, at least one desugared molasses to at least one cementitious and/or pozzolanic material during manufacture of the at least one cementitious and/or pozzolanic material.

In certain embodiments, provided is a method of manufacturing a cementitious material comprising adding, after pyroprocessing, at least one desugared molasses to at least one cementitious and/or pozzolanic material during manufacture of the at least one cementitious and/or pozzolanic material.

The at least one desugared molasses may be added to the at least one cementitious and/or pozzolanic material prior to and/or during grinding of the at least one cementitious and/or pozzolanic material.

The cementitious and/or pozzolanic material may comprise at least one of cement, fly ash, slag, such as blast furnace slag, silica fume or metakaolin. The cement may be a portland cement, a calcium aluminate cement, a magnesium phosphate cement, a magnesium potassium phosphate cement, a calcium sulfoaluminate cement, a gypsum-based cement, or any other suitable hydraulic binder.

In certain embodiments, the at least one desugared molasses may comprise at least one of desugared sugar beet molasses, desugared sugar cane molasses, or soy molasses (which may or may not be desugared). The subject desugared molasses may act as a grinding aid or performance enhancer in the manufacture of cementitious materials.

Desugared molasses is typically available as a liquid material, but it may be dried for use according to the present compositions and method. In certain embodiments, the at least one desugared molasses may contain an effective amount of from greater than 0% to about 45% sugars by weight, based on the dry weight of the at least one desugared molasses. In further embodiments, the at least one desugared molasses may contain an effective amount of from greater than 0% to about 40% sucrose by weight, based on the dry weight of the at least one desugared molasses.

Desugared sugar beet molasses is a desirable product for use in the subject cementitious composition, additive and method because it is not fit for human consumption, which reduces the value of the material. Samples of commercially available desugared sugar beet molasses were analyzed and determined to have the following composition (percentages are by weight based on total weight of the sample):

TABLE A

| | |
|---|---|
| Total Water - Karl-Fischer Method | 36-40% |
| Total Dry Matter Content | 60-64% |
| Protein | 6.3-6.9% |
| NPN Equivalent to Protein | 0.1-0.2% |
| Calcium | 0.05-0.3% |
| Phosphorous | <0.1% |
| Potassium | 6.7-8.1% |

TABLE A-continued

| | |
|---|---|
| Sodium | 1.6-1.9% |
| Chloride | 0.4-0.5% |
| Sulfates | 0.6-1.5 |
| Reducing Sugars | 1.2-1.9% |
| Fructose | <0.1% |
| Glucose | <0.1% |
| Lactose | 0-1.2% |
| Maltose | 0-1.9% |
| Sucrose | 12-22% |

The analyzed desugared sugar beet molasses should not be construed to limit in any way the scope of the present subject matter. Desugared sugar beet molasses is merely one example of possible desugared molasses which may be utilized according to the present compositions and method. Further, the composition of desugared sugar beet molasses may vary widely, and some desugared sugar beet molasses may not contain components which fall within the ranges presented in Table A. Table A is provided for illustrative purposes only.

The subject desugared molasses may be combined with any of a number of conventional additives for cementitious compositions which act as grinding aids or performance enhancers, and which include, but are not limited to glycols, alkanolamines, organic or inorganic salts, and organic polymers.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, slag, such as blast furnace slag, silica fume, metakaolin, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline cherts, and some shales. Fly ash is defined in ASTM C618.

If used, silica fume can be uncompacted or can be partially compacted or added as a slurry. Silica fume additionally reacts with the hydration byproducts of the cement binder, which may provide for increased strength of the finished articles and may decrease the permeability of the finished articles.

In certain embodiments, the at least one desugared molasses may be added to the at least one cementitious and/or pozzolanic material in an amount of from about 0.01 to about 0.3 dry weight percent, based on the weight of cementitious material. In certain embodiments, the at least one desugared molasses may be added to the at least one cementitious and/or pozzolanic material in an amount of from about 0.01 to about 0.1 dry weight percent, based on the weight of cementitious material. As used herein, "based on the weight of cementitious material" refers to the total dry weight of all cementitious and/or pozzolanic materials present in a cementitious composition.

In certain embodiments, the method and/or process may further comprise adding to the at least one cementitious and/or pozzolanic material at least one grinding aid and/or performance enhancer in addition to the desugared molasses, optionally in formulation with the at least one desugared molasses. The at least one grinding aid and/or performance enhancer may be added to the cementitious and/or pozzolanic material in an amount of from about 0.005 to about 0.2 weight percent, based on the weight of cementitious material.

The following examples are set forth merely to further illustrate the subject cementitious composition and/or admixture. The illustrative examples should not be construed as limiting the cementitious composition and/or admixture in any manner.

In the following samples, various additives were incorporated into cement clinker in order to attempt to improve the grinding process. The additives were added to the cement clinker in a 46% aqueous solution, by weight of the total additive/water mixture. The cement clinker was ground until a Blaine value of 3800±200 cm$^2$/g was achieved. The results are reported in Table 1. Dosages reported in Table 1 are based on total dry weight of cement clinker.

TABLE 1

| Grinding Aid | Dose (wt %) | Time (min) | Final Blaine value (cm$^2$/g) |
|---|---|---|---|
| Glycerol-based | 0.03 | 118 | 3900 |
| Glycerol-based | 0.06 | 110 | 3920 |
| Amine acetate-based | 0.03 | 105 | 3910 |
| Amine acetate-based | 0.06 | 105 | 4000 |
| Desugared Molasses | 0.03 | 100 | 3760 |
| Desugared Molasses | 0.06 | 122 | 3890 |

In the following samples, various mortars were tested to determine the compressive strength of mortars made with cements with various grinding aids added, as compared to a mortar prepared from a cement produced with no grinding aid added. All of the mortar samples had a water to cement weight ratio of 0.5 and a sand to cement weight ratio of 3. The spread at 0 minutes and 30 minutes after preparation, as well as the air content of each sample, were also determined. Results are reported in Table 2. Dosages reported in Table 2 are based on total dry weight of cement clinker.

TABLE 2

| Grinding Aid | Dose (wt %) | Spread (cm) | | Air (%) | Compressive Strength (MPa) | | | |
|---|---|---|---|---|---|---|---|---|
| | | 0 | 30 | | 1 day | 2 day | 7 day | 28 day |
| None | | 20.1 | 19.3 | 5.1 | 18.2 | 29.4 | 46.0 | 57.4 |
| Diethylene Glycol | 0.02 | 19.8 | 19.2 | 5.3 | 18.8 | 30.6 | 46.0 | 57.4 |
| Diethylene Glycol | 0.08 | 19.2 | 19.1 | 5.9 | 18.8 | 28.8 | 43.1 | 52.7 |
| Molasses | 0.02 | 20.3 | 19.2 | 5.1 | 18.0 | 29.7 | 47.6 | 60.1 |
| Molasses | 0.08 | 20.4 | 19.4 | 5.6 | 17.0 | 29.9 | 48.7 | 60.7 |
| Desugared Molasses | 0.02 | 19.5 | 18.9 | 5.1 | 20.1 | 30.2 | 50.5 | 60.6 |
| Desugared Molasses | 0.08 | 20.3 | 19.2 | 5.4 | 16.6 | 28.9 | 47.2 | 60.0 |

In a first embodiment, a cementitious material may be manufactured by a process comprising adding, after pyroprocessing, at least one desugared molasses to at least one cementitious and/or pozzolanic material during manufacture of the at least one cementitious and/or pozzolanic material.

The cementitious material of the first embodiment may include that the at least one desugared molasses is added to the at least one cementitious and/or pozzolanic material prior to and/or during grinding of the at least one cementitious and/or pozzolanic material.

The cementitious composition of either or both of the first or subsequent embodiments may include that the at least one cementitious and/or pozzolanic material comprises at least one of cement, fly ash, slag, silica fume or metakaolin.

The cementitious composition of any of the first or subsequent embodiments may further include that the at least one desugared molasses comprises at least one of desugared sugar beet molasses, desugared sugar cane molasses or soy molasses.

The cementitious composition of any of the first or subsequent embodiments may further include that the at least one desugared molasses contains an effective amount of from greater than 0% to about 45% sugars by weight, based on the dry weight of the at least one desugared molasses.

The cementitious composition of any of the first or subsequent embodiments may further include that the at least one desugared molasses contains an effective amount of from greater than 0% to about 40% sucrose by weight, based on the dry weight of the at least one desugared molasses.

The cementitious composition of any of the first or subsequent embodiments may further include that the at least one desugared molasses has a total water content of less than about 40% by weight as manufactured, excluding any water added to the desugared molasses product after manufacturing, based on the total weight of the desugared molasses.

The cementitious composition of any of the first or subsequent embodiments may further include that the at least one desugared molasses is added to the at least one cementitious and/or pozzolanic material in an amount of from about 0.01 to about 0.3 dry weight percent, based on the weight of cementitious material. The at least one desugared molasses may be added to the at least one cementitious and/or pozzolanic material in an amount of from about 0.01 to about 0.1 dry weight percent, based on the weight of cementitious material.

The cementitious composition of any of the first or subsequent embodiments may further comprise at least one grinding aid and/or performance enhancer in addition to the desugared molasses, added to the at least one cementitious and/or pozzolanic material, optionally in formulation with the at least one desugared molasses. The at least one grinding aid and/or performance enhancer may be added to the at least one cementitious and/or pozzolanic material in an amount of from about 0.005 to about 0.2 weight percent, based on the weight of cementitious material.

In a second embodiment, a method of manufacturing a cementitious material may comprise adding, after pyroprocessing, at least one desugared molasses to at least one cementitious and/or pozzolanic material during manufacture of the at least one cementitious and/or pozzolanic material.

The method of the second embodiment may include that the at least one desugared molasses is added to the at least one cementitious and/or pozzolanic material prior to grinding the at least one cementitious and/or pozzolanic material.

The method of either or both of the second or subsequent embodiments may further include that the at least one cementitious and/or pozzolanic material comprises at least one of cement, fly ash, slag, silica fume or metakaolin.

The method of any of the second or subsequent embodiments may further include that the at least one desugared molasses comprises at least one of desugared sugar beet molasses, desugared sugar cane molasses or soy molasses.

The method of any of the second or subsequent embodiments may further include that the at least one desugared molasses contains an effective amount of from greater than 0% to about 45% sugars by weight, based on the dry weight of the at least one desugared molasses.

The method of any of the second or subsequent embodiments may further include that the at least one desugared molasses contains an effective amount of from greater than 0% to about 40% sucrose by weight, based on the dry weight of the at least one desugared molasses.

The method of any of the second or subsequent embodiments may further include that the at least one desugared molasses has a total water content of less than about 40% by weight as manufactured, excluding any water added to the desugared molasses product after manufacturing, based on the total weight of the desugared molasses.

The method of any of the second or subsequent embodiments may further include that the at least one desugared molasses is added to the at least one cementitious and/or pozzolanic material in an amount of from about 0.01 to about 0.3 dry weight percent, based on the weight of cementitious material. The at least one desugared molasses may be added to the at least one cementitious and/or pozzolanic material in an amount of from about 0.01 to about 0.1 dry weight percent, based on the weight of cementitious material.

The method of any of the second or subsequent embodiments may further comprise adding at least one grinding aid and/or performance enhancer in addition to the at least one desugared molasses, optionally in formulation with the at least one desugared molasses. The at least one grinding aid and/or performance enhancer may be added to the at least one cementitious and/or pozzolanic material in an amount of from about 0.005 to about 0.2 weight percent, based on the weight of cementitious material.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A method of manufacturing a cementitious material comprising adding, after pyroprocessing and prior to and/or during grinding, at least one desugared molasses to at least one cementitious and/or pozzolanic material during manufacture of the at least one cementitious and/or pozzolanic material, wherein the at least one desugared molasses does not include by-products of molasses fermentation processes.

2. The method of claim 1, wherein the at least one cementitious and/or pozzolanic material comprises at least one of cement, fly ash, slag, silica fume or metakaolin.

3. The method of claim 1, wherein the at least one desugared molasses comprises at least one of desugared sugar beet molasses, desugared sugar cane molasses or soy molasses.

4. The method of claim 1, wherein the at least one desugared molasses contains an amount of from greater than 0% to about 45% sugars by weight, based on the dry weight of the at least one desugared molasses.

5. The method of claim 1, wherein the at least one desugared molasses contains an amount of from greater than 0% to about 40% sucrose by weight, based on the dry weight of the at least one desugared molasses.

6. The method of claim 1, wherein the at least one desugared molasses has a total water content of less than about 40% by weight as manufactured, excluding any water added to the desugared molasses after manufacturing, based on the total weight of the desugared molasses.

7. The method of claim 1, wherein the at least one desugared molasses is added to the at least one cementitious and/or pozzolanic material in an amount of from about 0.01 to about 0.3 dry weight percent, based on the weight of cementitious material.

8. The method of claim 7, wherein the at least one desugared molasses is added to the at least one cementitious and/or pozzolanic material in an amount of from about 0.01 to about 0.1 weight percent, based on the weight of cementitious material.

9. The method of claim 1, further comprising adding to the at least one cementitious and/or pozzolanic material at least one grinding aid and/or performance enhancer in addition to the at least one desugared molasses, optionally in formulation with the desugared molasses.

10. The method of claim 9, wherein the at least one grinding aid and/or performance enhancer is added to the at least one cementitious and/or pozzolanic material in an amount of from about 0.005 to about 0.2 weight percent, based on the weight of cementitious material.

* * * * *